(12) United States Patent
Patel et al.

(10) Patent No.: US 10,504,153 B2
(45) Date of Patent: Dec. 10, 2019

(54) USING THE UTILITY OF CONFIGURATIONS IN AD SERVING DECISIONS

(71) Applicant: Google LLC, Mountain View, CA (US)

(72) Inventors: Amit J. Patel, Saratoga, CA (US); Hal R. Varian, Danville, CA (US)

(73) Assignee: Google LLC, Mountain View, CA (US)

( * ) Notice: Subject to any disclaimer, the term of this patent is extended or adjusted under 35 U.S.C. 154(b) by 1115 days.

(21) Appl. No.: 14/720,294

(22) Filed: May 22, 2015

(65) Prior Publication Data

US 2015/0254728 A1 Sep. 10, 2015

Related U.S. Application Data

(63) Continuation of application No. 11/169,323, filed on Jun. 28, 2005, now abandoned.

(51) Int. Cl.
*G06Q 30/00* (2012.01)
*G06Q 30/02* (2012.01)

(52) U.S. Cl.
CPC ..... *G06Q 30/0269* (2013.01); *G06Q 30/0264* (2013.01); *G06Q 30/0273* (2013.01)

(58) Field of Classification Search
CPC .................. G06Q 30/0207–30/0277
See application file for complete search history.

(56) References Cited

U.S. PATENT DOCUMENTS

| | | |
|---|---|---|
| 6,253,188 B1 | 6/2001 | Witek |
| 6,285,999 B1 | 9/2001 | Page |
| 6,907,566 B1 | 6/2005 | McElfresh |
| 7,251,589 B1 * | 7/2007 | Crowe ............... G06F 17/18 702/181 |
| 2002/0053078 A1 * | 5/2002 | Holtz ............... G06Q 30/06 725/14 |
| 2003/0149937 A1 * | 8/2003 | McElfresh ......... G06Q 30/02 715/210 |
| 2004/0059708 A1 * | 3/2004 | Dean ................. G06Q 30/02 |
| 2004/0093327 A1 * | 5/2004 | Anderson ......... G06Q 30/02 |
| 2004/0267806 A1 | 12/2004 | Lester |
| 2005/0137939 A1 * | 6/2005 | Calabria ........... G06Q 30/02 705/26.1 |
| 2005/0139397 A1 | 6/2005 | Achilles |
| 2006/0020506 A1 * | 1/2006 | Axe .................. G06Q 30/02 705/14.43 |

(Continued)

OTHER PUBLICATIONS

Allan, Sterling D., Optimize Google AdSense Revenue by Reducing the Number of Ads on a Page, Sep. 9, 2004, www.webpronews.com, 3 pages (Year: 2004).*

(Continued)

*Primary Examiner* — Michael W Schmucker
(74) *Attorney, Agent, or Firm* — Fish & Richardson P.C.

(57) ABSTRACT

Instead of accepting competing ads and using an arbitration function (e.g., an auction) to choose winning ads to be served with a document, sets of ads (perhaps having different characteristics) can be generated, and an arbitration function can be used to select the winning set of ads. Such arbitrations on sets of ads can consider how ads, search results, colors, positions, fonts, etc., all interact with each other and affect the usefulness of the sets of ads to advertisers, end users, document publishers, and/or an ad serving entity.

15 Claims, 10 Drawing Sheets

| Content ads, horizontal block with 4 ads | | | | |
|---|---|---|---|---|
| Utility Adjustment | 1 ad | 2 ads | 3 ads | 4 ads |
| Pos 1 | 3.07 | 2.02 | 1.36 | 1.00 |
| Pos 2 | -- | 1.68 | 1.28 | 0.90 |
| Pos 3 | -- | -- | 0.96 | 0.76 |
| Pos 4 | -- | -- | -- | 0.64 |

(56) References Cited

U.S. PATENT DOCUMENTS

2006/0095281 A1* 5/2006 Chickering ............ G06Q 30/02
705/37

OTHER PUBLICATIONS

Form PCT/ISA/220, Notification of Transmittal of the International Search Report and Written Opinion for PCT/US06/25243, dated Jan. 5, 2007 (2 pgs.).

Form PCT/ISA/210, International Search Report for PCT/US06/25243, dated Jan. 5, 2007 (2 pgs.).

Form PCT/ISA/237, Written Opinion of the International Searching Authority for PCT/US06/25243, dated Jan. 5, 2007 (3 pgs.).

Examiner's First Report for Australian Patent Application No. 2006263t.87, dated Aug. 10, 2009 (2 pgs.).

Notice of Preliminary Rejection for Korean Patent Application No. 10-2008-7002318, dated Jan. 29, 2010 (4 pgs.) with translation (3 pgs.).

Office Action for Canadian Patent Application No. 2,613,531, dated Feb. 8, 2011 (4 pgs.).

Allan, Sterling D., Optimize Google AdSense Revenue by Reducing the Number of Ads on a Page, Sep. 9, 2004, www.webpronews.com, 3 pages.

First Examination Report from corresponding Indian Patent Application No. 933/DELNP/2008, dated Jul. 4, 2013 (2 pgs.).

S. Brin and L. Page, The Anatomy of a Large-Scale Hypertextual Search Engine, Seventh International World Wide Web Conference, Brisbane, Australia.

Morgan, John, Combinatorial Auctions in the Information Age: an Empirical Study, Advances in Applied Microeconomics vol. 11, M. Baye, ed., JAI Press, 2002.

U.S. Appl. No. 10/314,427, filed Dec. 6, 2002, Jeffrey Dean, Georges Harik, Paul Buchheit.

U.S. Appl. No. 10/375,900, filed Feb. 26, 2003, Darrell Anderson, Paul Buchheit, Alex Carobus, Claire Cui, Jeffrey Dean, Georges Harik, Deepak Jindal, Narayanan Shivakumar.

* cited by examiner

FIGURE 7B

| Number | Configurations | | | Utilities | | | User | Total Utility |
|---|---|---|---|---|---|---|---|---|
| | A | B | C | A | B | C | | |
| c6 | R1 | R2 | R3 | $100 * 0.94 = 94.00 | $90 * 0.77 = 69.30 | $5 * 0.67 = 3.35 | 0.00 | 166.65 |
| c7 | R1 | R2 | — | $100 * 0.95 = 95.00 | $90 * 0.82 = 73.80 | = 0.00 | 0.00 | 168.80 |
| c9 | R1 | R3 | R2 | $100 * 0.94 = 94.00 | $90 * 0.67 = 60.30 | $5 * 0.77 = 3.85 | 0.00 | 158.15 |
| c13 | R1 | — | R2 | $100 * 0.95 = 95.00 | = 0.00 | $5 * 0.82 = 4.10 | 0.00 | 99.10 |
| c15 | R1 | — | — | $100 * 1.00 = 100.00 | = 0.00 | = 0.00 | 0.00 | 100.00 |
| c18 | R2 | R1 | R3 | $100 * 0.77 = 77.00 | $90 * 0.94 = 84.60 | $5 * 0.67 = 3.35 | 0.00 | 164.95 |
| c19 | R2 | R1 | — | $100 * 0.82 = 82.00 | $90 * 0.95 = 85.50 | = 0.00 | 0.00 | 167.50 |
| c24 | R2 | R3 | R1 | $100 * 0.77 = 77.00 | $90 * 0.67 = 60.30 | $5 * 0.94 = 4.70 | 0.00 | 142.00 |
| c28 | R2 | — | R1 | $100 * 0.82 = 82.00 | = 0.00 | $5 * 0.95 = 4.75 | 0.00 | 86.75 |
| c33 | R3 | R1 | R2 | $100 * 0.67 = 67.00 | $90 * 0.94 = 84.60 | $5 * 0.77 = 3.85 | 0.00 | 155.45 |
| c36 | R3 | R2 | R1 | $100 * 0.67 = 67.00 | $90 * 0.77 = 69.30 | $5 * 0.94 = 4.70 | 0.00 | 141.00 |
| c49 | — | R1 | R2 | = 0.00 | $90 * 0.95 = 85.50 | $5 * 0.82 = 4.10 | 0.00 | 89.60 |
| c51 | — | R1 | — | = 0.00 | $90 * 1.00 = 90.00 | = 0.00 | 0.00 | 90.00 |
| c52 | — | R2 | R1 | = 0.00 | $90 * 0.82 = 73.80 | $5 * 0.95 = 4.75 | 0.00 | 78.55 |
| c60 | — | — | R1 | = 0.00 | = 0.00 | $5 * 1.00 = 5.00 | 0.00 | 5.00 |
| c63 | — | — | — | = 0.00 | = 0.00 | = 0.00 | 0.50 | 0.50 |

FIGURE 7C

| Content ads, horizontal block with 4 ads | | | | |
|---|---|---|---|---|
| Utility Adjustment | 1 ad | 2 ads | 3 ads | 4 ads |
| Pos 1 | 3.07 | 2.02 | 1.36 | 1.00 |
| Pos 2 | -- | 1.68 | 1.28 | 0.90 |
| Pos 3 | -- | -- | 0.96 | 0.76 |
| Pos 4 | -- | -- | -- | 0.64 |

USING THE UTILITY OF CONFIGURATIONS IN AD SERVING DECISIONS

This application is a continuation of U.S. application Ser. No. 11/169,323, filed Jun. 28, 2005, the disclosure of which is incorporated herein by reference in its entirety.

§ 1. BACKGROUND OF THE INVENTION

§ 1.1 Field of the Invention

The present invention concerns advertisements ("ads"), such as ads served in an online environment. In particular, the present invention concerns improving decisions related to serving ads.

§ 1.2 Background Information

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Interactive advertising provides opportunities for advertisers to target their ads to a receptive audience. That is, targeted ads are more likely to be useful to end users since the ads may be relevant to a need inferred from some user activity (e.g., relevant to a user's search query to a search engine, relevant to content in a document requested by the user, etc.) Query keyword relevant advertising, such as the AdWords advertising system by Google of Mountain View, Calif., has been used by search engines. Similarly, content-relevant advertising systems have been proposed. For example, U.S. patent application Ser. Nos. 10/314,427 (incorporated herein by reference and referred to as "the '427 application") titled "METHODS AND APPARATUS FOR SERVING RELEVANT ADVERTISEMENTS", filed on Dec. 6, 2002 and listing Jeffrey A. Dean, Georges R. Harik and Paul Buchheit as inventors; and Ser. No. 10/375,900 (incorporated by reference and referred to as "the '900 application") titled "SERVING ADVERTISEMENTS BASED ON CONTENT," filed on Feb. 26, 2003 and listing Darrell Anderson, Paul Buchheit, Alex Carobus, Claire Cui, Jeffrey A. Dean, Georges R. Hark, Deepak Jindal and Narayanan Shivakumar as inventors, describe methods and apparatus for serving ads relevant to the content of a document, such as a Web page for example. The AdSense advertising system by Google of Mountain View, Calif. is an example of a content targeted ad delivery system used to serve ads on Web pages.

Current systems for serving targeted text ads may auction or arbitrate a given number of "spots" on a document (e.g., a Web page instance) to competing ads. Such spots typically specify a particular type of ad that may be served. For example, FIG. 1 illustrates a search result Web page portion 100 having two (2) wide-format, text ad spots at the top of the Web page filled by two (2) ads 110, 112, and eight (8) normal-format text ad spots in the right column of the page filled by eight (8) ads 120, 122, 124, 126, 128, 130, 132, 134. There may be more than two (2) ads competing to be served in the two (2) wide-format text ad spots and more than eight (8) ads competing to be served in the eight (8) normal-format text ad spots. Ad serving facilities may arbitrate each ad spot to competing ads using an auction model. For example, competing ads can be placed in available ad spots using a bid price (associated with each ad) only. As another example, competing ads can be placed in available ad spots using some combination of an offer price, ad performance (e.g., in terms of selection rate, user ratings, conversion rate, etc.), and/or ad relevancy.

Regardless of the arbitration technique used, generally, all available ad spots are filled (to the extent that there are enough ads available to fill them). However, there may be some instances under which this policy of filling all available ad spots, if possible or to the greatest extent possible, might not be desirable from the standpoint of the end user, the Web page owner or publisher, and/or the ad serving facility. Accordingly, better techniques for determining how to best fill available ad spots would be useful.

§ 2. SUMMARY OF THE INVENTION

At least some embodiments consistent with the present invention may be used to arbitrate the serving of ads competing to be rendered with a document. For example, instead of accepting competing ads and using an arbitration function (e.g., an auction) to choose winning ads to be served with a document, embodiments consistent with the present invention may (i) generate sets of ads (perhaps having different characteristics), and (ii) select the winning set of ads using an arbitration function. Such arbitrations on sets of ads can consider how ads, search results, colors, positions, fonts, etc., all interact with each other and affect the usefulness of the sets of ads to advertisers, end users, document publishers, and/or an ad serving entity.

§ 3. BRIEF DESCRIPTION OF THE DRAWINGS

FIGS. 7A-7C illustrate an example of how position selection rates can change with respect to the number of ads served.

Figure 8:
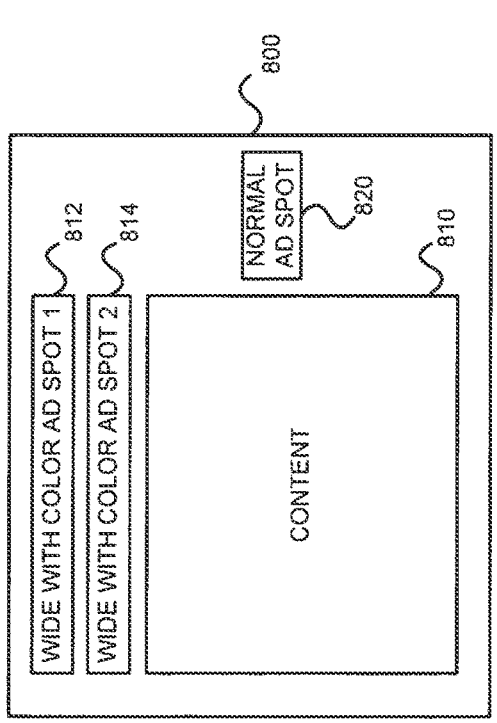
Figure 9:
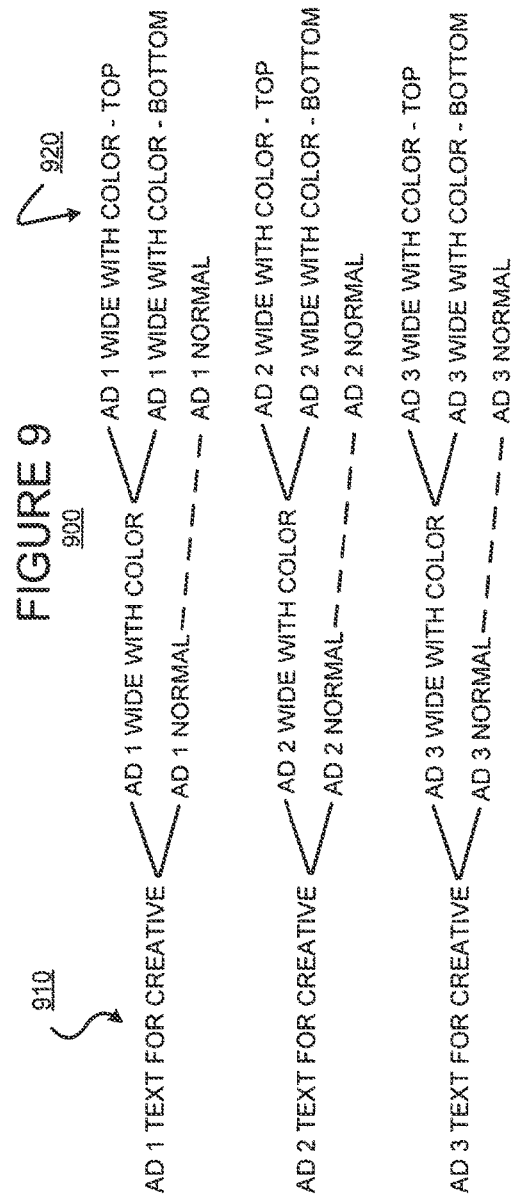
Figure 10:
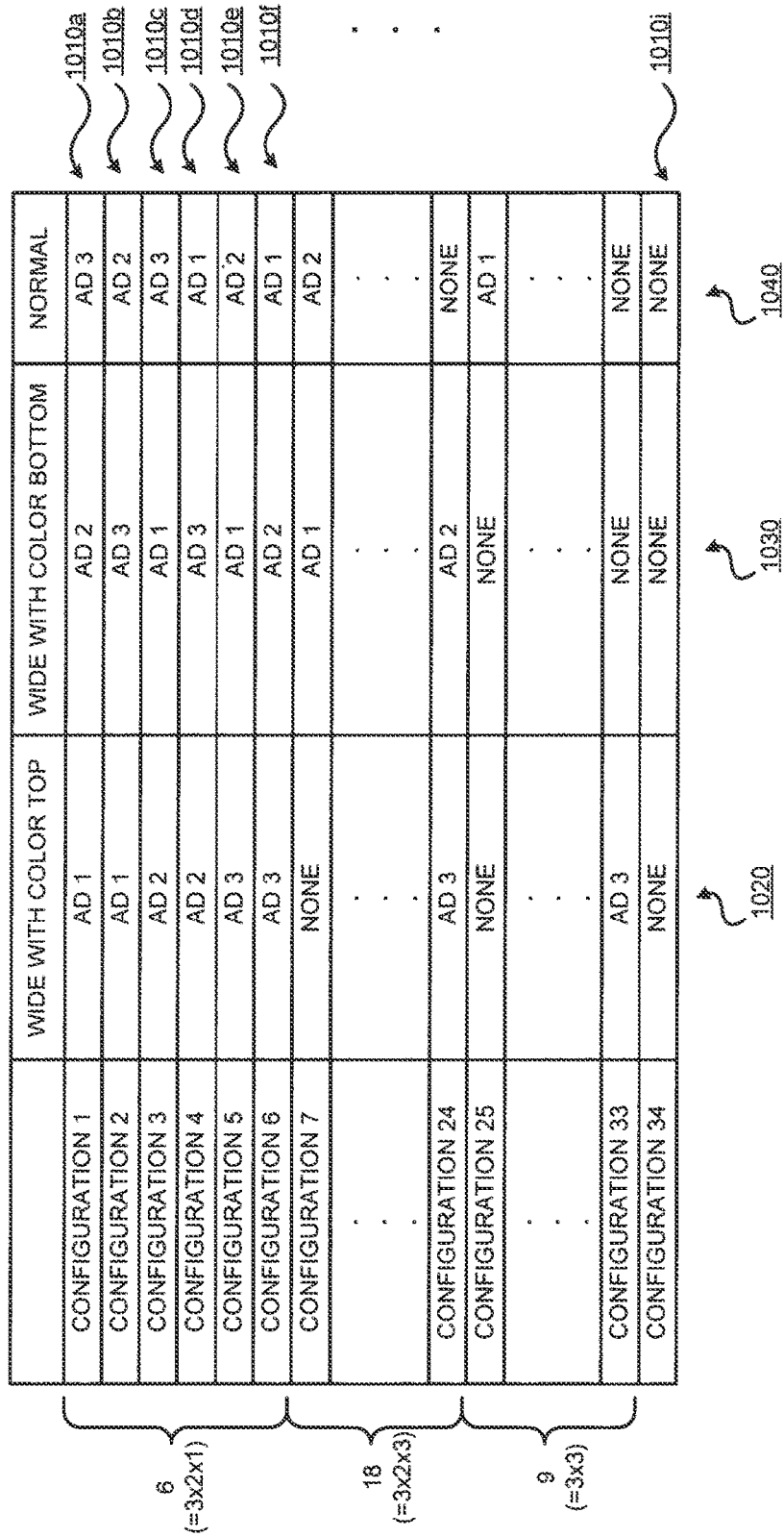

FIGS. 8-10 provide an example that illustrates how different configurations can be determined for different ad spots and different ad creative source information.

§ 4. DETAILED DESCRIPTION

The present invention may involve novel methods, apparatus, message formats, and/or data structures for determining utility values of various ad configurations, and/or using such utility values in ad serving decisions. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

In the following, definitions of terms that may be used in the specification are set forth in § 4.1. Then, environments in which, or with which, embodiments consistent with the present invention may operate are described in § 4.2. Then, exemplary embodiments consistent with the present invention are described in § 4.3. Examples of operations are provided in § 4.4. Finally, some conclusions regarding the present invention are set forth in § 4.5.

§ 4.1 Definitions

Online ads may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a document on which, or with which, the ad was served, a search query or search results associated with the serving of the ad, a user characteristic (e.g., their geographic location, the language used by the user, the type of browser used, previous page views, previous behavior, user account, any Web cookies used by the system, user device characteristics, etc.), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain location, etc. As another example, in some systems, an advertiser may specify that its ad is to be served only if a page or search query includes certain keywords or phrases. As yet another example, in some systems, an advertiser may specify that its ad is to be served only if a document, on which or with which the ad is to be served, includes certain topics or concepts, or falls under a particular cluster or clusters, or some other classification or classifications (e.g., verticals). In some systems, an advertiser may specify that its ad is to be served only to (or is not to be served to) user devices having certain characteristics. Finally, in some systems an ad might be targeted so that it is served in response to a request sourced from a particular location, or in response to a request concerning a particular location.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

The ratio of the number of selections (e.g., clickthroughs) of an ad to the number of impressions of the ad (i.e., the number of times an ad is rendered) is defined as the "selection rate" (or "clickthrough rate") of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Often, if user actions don't indicate a consummated purchase, they may indicate a sales lead, although user actions constituting a conversion are not limited to this. Indeed, many other definitions of what constitutes a conversion are possible.

The ratio of the number of conversions to the number of impressions of the ad (i.e., the number of times an ad is rendered), and the ratio of the number of conversions to the number of selections (or the number of some other event), are both referred to as the "conversion rate." The type of conversion rate will be apparent from the context in which it is used. If a conversion is defined to be able to occur within a predetermined time since the serving of an ad, one possible definition of the conversion rate might only consider ads that have been served more than the predetermined time in the past.

A "property" is something on which ads can be presented. A property may include online content (e.g., a Website, an MP3 audio program, online games, etc.), offline content (e.g., a newspaper, a magazine, a theatrical production, a concert, a sports event, etc.), and/or offline objects (e.g., a billboard, a stadium score board, and outfield wall, the side of truck trailer, etc.). Properties with content (e.g., magazines, newspapers, Websites, email messages, etc.) may be referred to as "media properties." Although properties may themselves be offline, pertinent information about a property (e.g., attribute(s), topic(s), concept(s), category(ies), keyword(s), relevancy information, type(s) of ads supported, etc.) may be available online. For example, an outdoor jazz music festival may have entered the topics "music" and "jazz", the location of the concerts, the time of the concerts, artists scheduled to appear at the festival, and types of available ad spots (e.g., spots in a printed program, spots on a stage, spots on seat backs, audio announcements of sponsors, etc.).

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as JavaScript, etc.). In many cases, a document has an addressable storage location and can therefore be uniquely identified by this addressable location. A universal resource locator (URL) is an address used to access information on the Internet.

A "Web document" includes any document published on the Web. Examples of Web documents include, for example, a Website or a Web page.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer, Netscape, Opera, Firefox, etc.), a media player (e.g., an MP3 player, a Realnetworks streaming audio file player, etc.), a viewer (e.g., an Abobe Acrobat pdf reader), etc.

A "content owner" is a person or entity that has some property right in the content of a media property (e.g., document). A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary. A "Web publisher" is an example of a content owner.

"User information" may include user behavior information and/or user profile information.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

An "ad area" may be used to describe an area (e.g., spatial and/or temporal) of a document reserved or made available to accommodate the rendering of ads. For example, Web pages often allocate a number of spots where ads can be rendered, referred to as "ad spots". As another example, an audio program may allocate "ad time slots," which may be thought of more generally as "ad spots."

Figure 2:
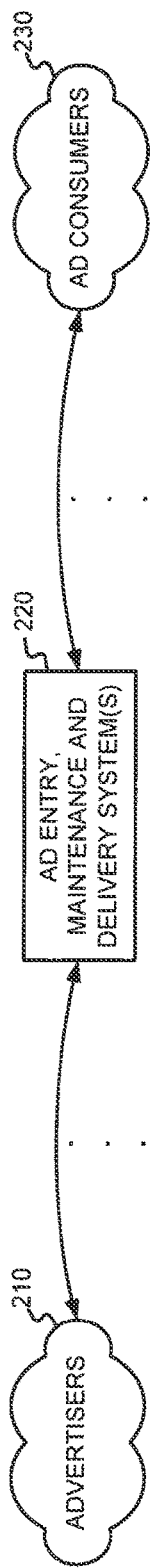
FIG. 2 is a high-level diagram showing parties or entities that can interact with an advertising system.

§ 4.2 Exemplary Environments in which, or with which, Embodiments Consistent with the Present Invention may Operate FIG. 2 is a high level diagram of an advertising environment. The environment may include an ad entry, maintenance and delivery system (simply referred to as an ad server) 220. Advertisers 210 may directly, or indirectly, enter, maintain, and track ad information in the system 220. The ads may be in the form of graphical ads such as so-called banner ads, text only ads, image ads, audio ads, animation ads, video ads, ads combining one of more of any of such components, etc. The ads may also include embedded information, such as a link, and/or machine executable instructions. Ad consumers 230 may submit requests for ads to, accept ads responsive to their request from, and provide usage information to, the system 220. An entity other than an ad consumer 230 may initiate a request for ads. Although not shown, other entities may provide usage information (e.g., whether or not a conversion or selection related to the ad occurred) to the system 220. This usage information may include measured or observed user behavior related to ads that have been served.

The ad server 220 may be similar to the one described in FIG. 2 of the '900 application. An advertising program may include information concerning accounts, campaigns, creatives, targeting, etc. The term "account" relates to information for a given advertiser (e.g., a unique e-mail address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line may have one or more ad groups, each containing one or more ads. Each ad group may include targeting information (e.g., a set of keywords, a set of one or more topics, geolocation information, user profile information, etc.), and price information (e.g., a maximum cost or offer per selection, a maximum cost or offer per conversion, a cost or offer per selection, a cost or offer per conversion, etc.). Alternatively, or in addition, each ad group may include an average cost (e.g., average cost per selection, average cost per conversion, etc.). Therefore, a single maximum cost, cost, and/or a single average cost may be associated with one or more keywords, and/or topics. As stated, each ad group may have one or more ads or "creatives" (That is, ad content that is ultimately rendered to an end user.). Each ad may also include a link to a URL (e.g., a landing Web page, such as the home page of an advertiser, or a Web page associated with a particular product or service). Naturally, the ad information may include more or less information, and may be organized in a number of different ways.

Figure 3:
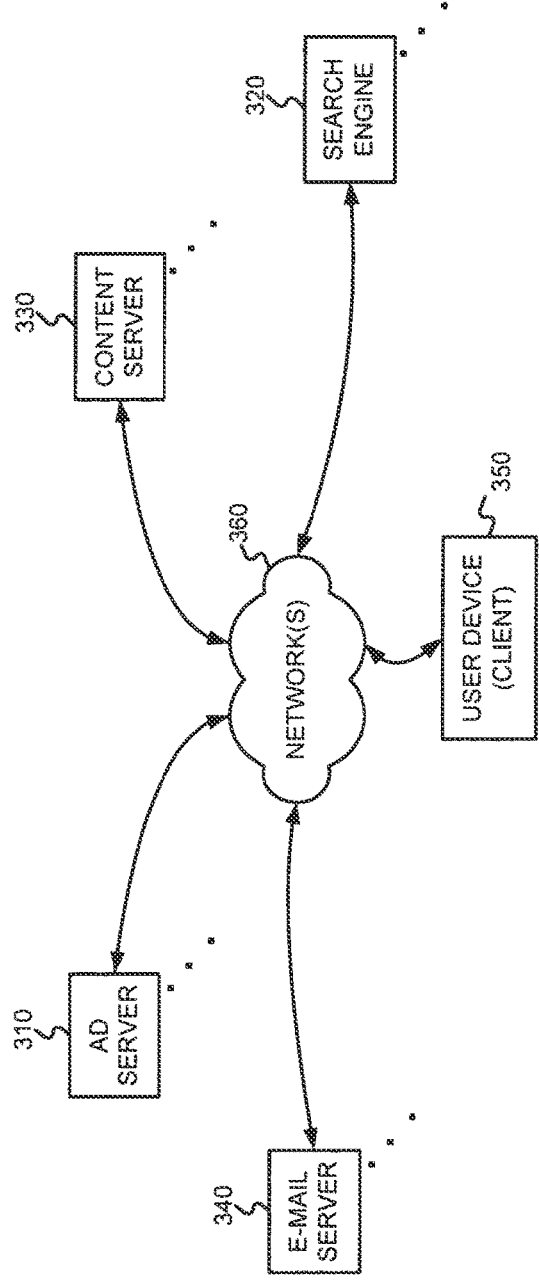
FIG. 3 is a diagram illustrating an environment in which, or with which, embodiments consistent with the present invention may operate.

FIG. 3 illustrates an environment 300 in which, or with which, embodiments consistent with the present invention may be used. A user device (also referred to as a "client" or "client device") 350 may include a browser facility (such as the Firefox browser from Mozilla, the Explorer browser from Microsoft, the Opera Web Browser from Opera Software of Norway, the Navigator browser from AOL/Time Warner, etc.), some other content rendering facility, an e-mail facility (e.g., Outlook from Microsoft), etc. A search engine 320 may permit user devices 350 to search collections of documents (e.g., Web pages). A content server 320 may permit user devices 350 to access documents. An e-mail server (such as Gmail from Google, Hotmail from Microsoft Network, Yahoo Mail, etc.) 340 may be used to provide e-mail functionality to user devices 350. An ad server 310 may be used to serve ads to user devices 350. For example, the ads may be served in association with search results provided by the search engine 320. Alternatively, or in addition, content-relevant ads may be served in association with content provided by the content server 330, and/or e-mail supported by the e-mail server 340 and/or user device e-mail facilities.

As discussed in the '900 application, ads may be targeted to documents served by content servers. Thus, one example of an ad consumer 230 is a general content server 330 that receives requests for documents (e.g., articles, discussion threads, music, video, graphics, search results, Web page listings, etc.), and retrieves the requested document in response to, or otherwise services, the request. The content server may submit a request for ads to the ad server 220/310. Such an ad request may include a number of ads desired (or the number of available ad spots). The ad request may also include document request information. This information may include the document itself (e.g., a Web page), a category or topic corresponding to the content of the document or the document request (e.g., arts, business, computers, arts-movies, arts-music, etc.), part or all of the document request, content age, content type (e.g., text, graphics, video, audio, mixed media, etc.), geo-location information, document information, etc.

The content server 330 may combine the requested document with one or more of the advertisements provided by the ad server 220/310. This combined information including the document content and advertisement(s) is then forwarded towards the end user device 350 that requested the document, for presentation to the user. Finally, the content server 330 may transmit information about the ads and how, when, and/or where the ads are to be rendered (e.g., position, selection or not, impression time, impression date, size, conversion or not, etc.) back to the ad server 220/310. Alternatively, or in addition, such information may be provided back to the ad server 220/310 by some other means.

Another example of an ad consumer 230 is the search engine 320. A search engine 320 may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine 320 may submit a request for ads to the ad server 220/310. The request may include a number of ads desired (or the number of available ad spots). This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate, and/or as described below, information related to, and/or derived from, the search query), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, topics of identified documents, feature vectors of identified documents, etc.

The search engine 320 may combine the search results with one or more of the advertisements provided by the ad server 220/310. This combined information including the search results and advertisement(s) is then forwarded towards the user that submitted the search, for presentation to the user. Preferably, the search results are maintained as distinct from the ads, so as not to confuse the user between paid advertisements and presumably neutral search results.

Finally, the search engine 320 may transmit information about the ad and when, where, and/or how the ad was to be rendered (e.g., position, click-through or not, impression time, impression date, size, conversion or not, etc.) back to the ad server 220/310. Such information may include information for determining on what basis the ad was determined to be relevant (e.g., strict or relaxed match, or exact, phrase, or broad match, etc.). Alternatively, or in addition, such information may be provided back to the ad server 220/310 by some other means.

Finally, the e-mail server 340 may be thought of, generally, as a content server in which a document served is simply an e-mail. Further, e-mail applications (such as Microsoft Outlook for example) may be used to send and/or receive e-mail. Therefore, an e-mail server 340 or application may be thought of as an ad consumer 230. Thus, e-mails may be thought of as documents, and targeted ads may be served in association with such documents. For example, one or more ads may be served in, under, over, or otherwise in association with an e-mail.

Although the foregoing examples described servers as (i) requesting ads, and (ii) combining them with content, one or both of these operations may be performed by a client device (such as an end user computer for example).

§ 4.3 Exemplary Embodiments

Figure 1:
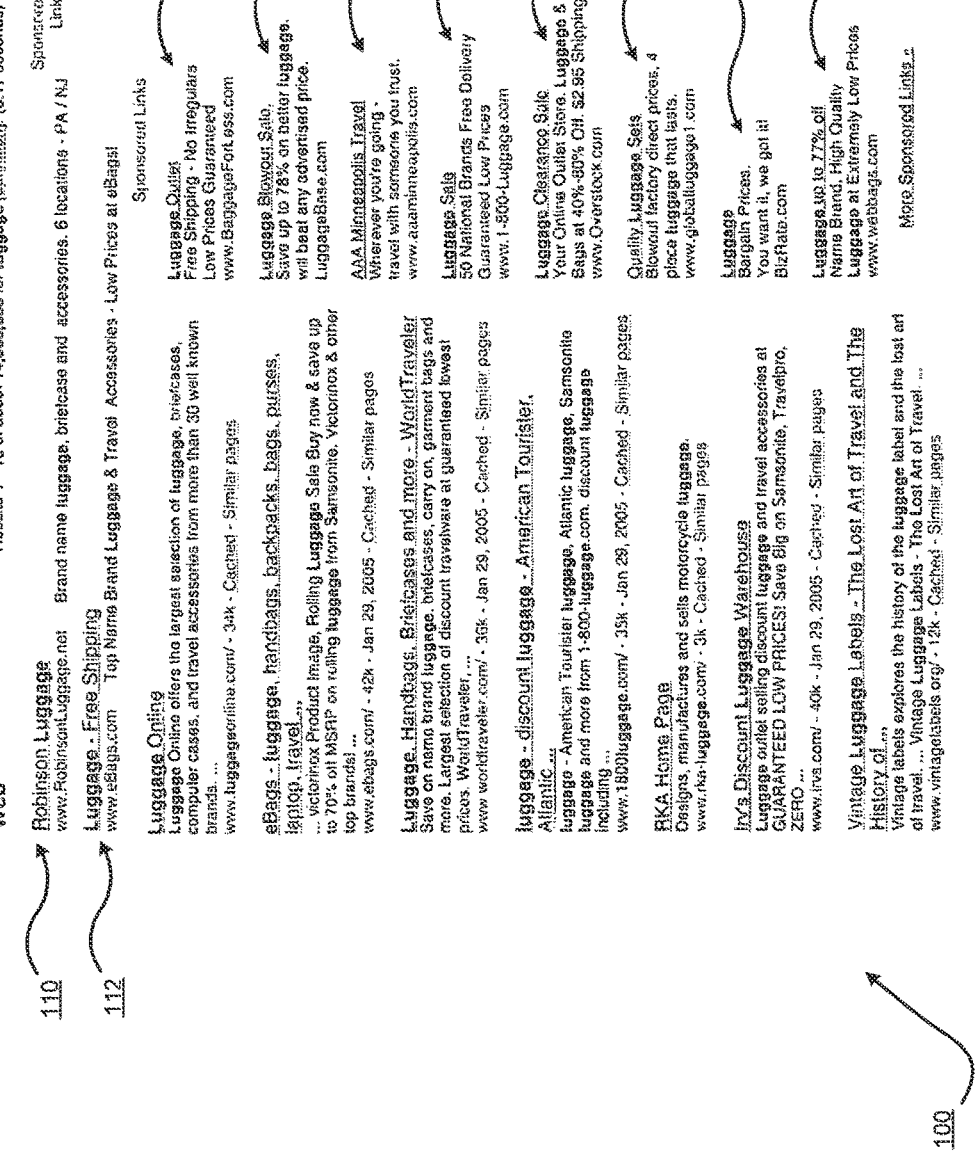
FIG. 1 illustrates a search result Web page portion having a number of filled ad spots.

The present invention may be used to determine a utility value for serving each of various combinations of ads. For example, referring back to FIG. 1, in certain instances, it might be better to serve one (1) ad (or no ads) in the two (2) wide-format text ad spots on the top of the search results Web page (thereby leaving one of the wide-format text ad spots blank) and to serve seven (7) (or less) ads in the eight (8) normal-format text ad spots in the right margin of the search results Web Page (thereby leaving one of the normal-format text ad spots blank). Although the exemplary Web Page in FIG. 1 included a fixed number of ad spots of a particular type, some documents might be less restrictive. For example, in some documents, ad spots might be open to ads of various different formats. Indeed, the types and numbers of ads that may be served with a document may be defined in a number of different ways, and need not be defined by the document itself.

A combination of an ad's parameters (e.g., size, color, font, brightness, style, etc.), its spatial and/or temporal position, its frequency, etc. may be referred to as the ad's "treatment." Thus, "treatment" can be used to described characteristics of the rendering (e.g., display) of an ad. The way in which ads with different treatments can be determined from common "seed" information is illustrated in an example described in § 4.4 below with reference to FIG. 9.

In the following, a "configuration" is defined to be a description of a set of ad participants P (which may be served with a document). It is possible to generate different ad participants from common "seed" information. For example, creative text may be used as seed information to generate ads of different sizes, colors, fonts, brightnesses, etc. (which may be referred to as ad "parameters" or ad "formats"). Further, a given ad participant may be placed in different spatial and/or temporal positions (e.g., ad spots) in different configurations. Furthermore, a given ad participant may be placed with different frequencies in different configurations. Thus, a "configuration" may be used to describe a set of ads, and their associated treatments, to be placed on, or otherwise rendered in association with, a document. Note that the same set of ads may be described by different configurations if the ads have different treatments.

Figure 4:
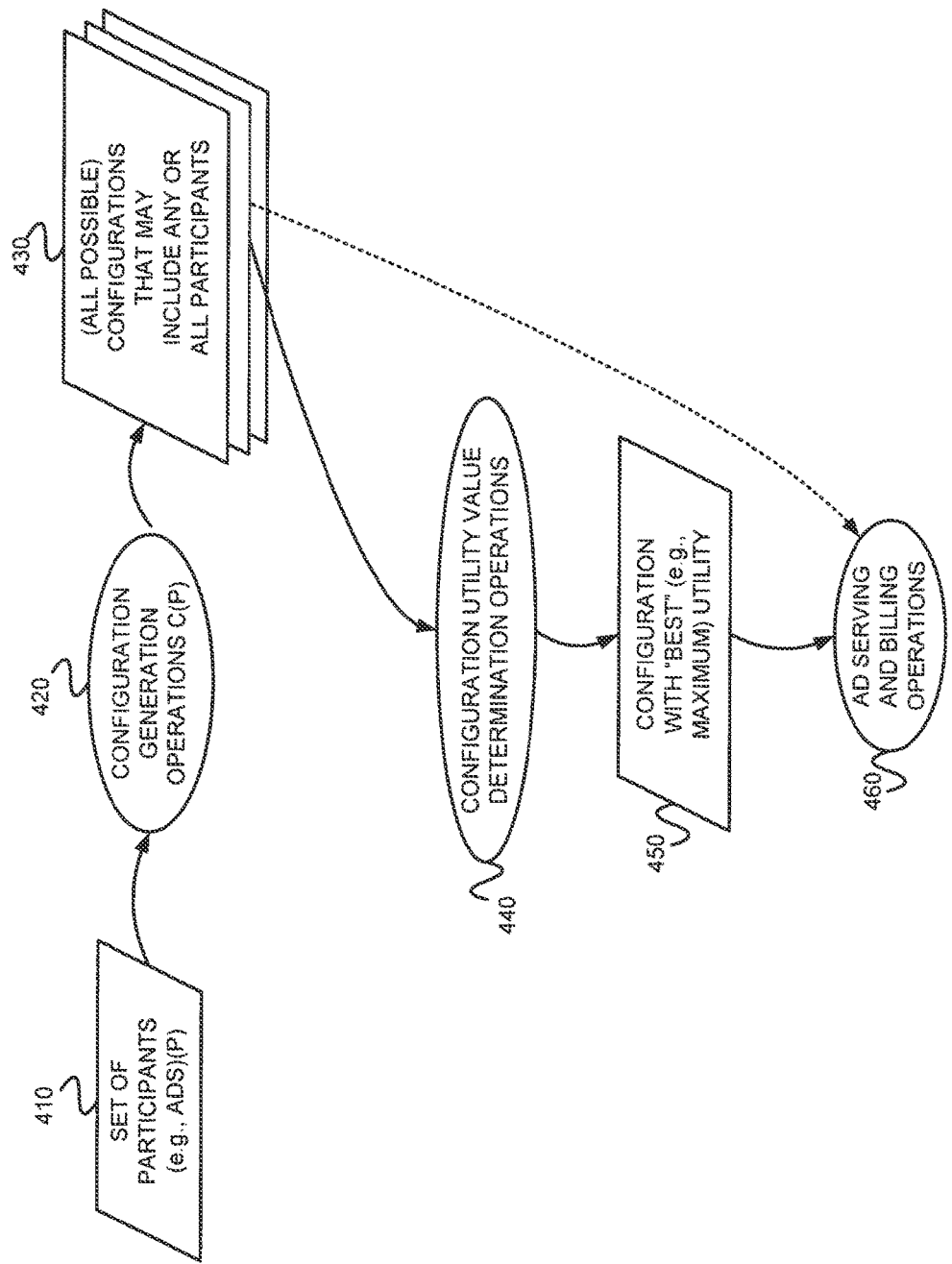
FIG. 4 is a bubble diagram of operations that may be performed, and information that may be used and/or generated, in a manner consistent with the present invention.

FIG. 4 is a bubble diagram illustrating operations that may be performed, and information that may be used and/or generated, in a manner consistent with the present invention. As shown in FIG. 4, a set of participants 410 is provided to configuration generation operations 420, which may generate various configurations, each of which configurations may include any or all participants 430. These configurations 430 may be provided to configuration utility value determination operations 440, which may determine the "best" configuration (e.g., the configuration with the maximum utility value) 450. This "best" configuration 450 may then be used to serve a set of one or more ads with particular treatments, and advertisers may be billed (perhaps subject to the occurrence of a subsequent condition such as a selection, a conversion, etc.), as indicated by ad serving and billing operations 460.

Referring back to configuration generation operations 420, a configuration function C(P) may accept a set of participants and return all possible configurations that include any or all of those participants (which may include an empty configuration—i.e., one with none of the participants.) Various techniques may be used to reduce the number of configurations. For, example, constraints on allowable configurations may be imposed. Alternatively, or in addition, various approximations or heuristics may be used when determining the optimal configuration.

Figure 5:
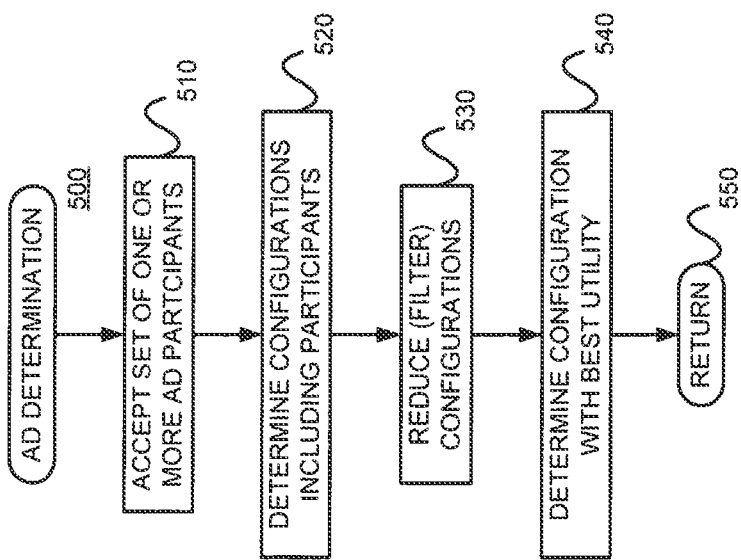
FIG. 5 is a flow diagram of an exemplary method for determining, in a manner consistent with the present invention, a combination of one or more ads to serve in one or more ad spots.

FIG. 5 is a flow diagram of an exemplary method 500 for determining, in a manner consistent with the present invention, a combination of one or more ads to serve in one or more ad spots. A set of one or more ad participants is accepted. (Block 510) Then, a set of configurations, each including one or more of the participants is determined. (Block 520) The number of configurations may be reduced. (Block 530) Then, the configuration with the best utility (e.g., maximum utility value) is determined (Block 540), and the method 500 is left (Node 550).

§ 4.3.1 Exemplary Techniques for Selecting a Configuaration

Referring back to configuration utility determination operations 440 and block 540, in at least some embodiments consistent with the present invention, a utility function U(c) may be defined to accept a configuration and return an expected utility of that configuration. In at least some embodiments consistent with the present invention, the expected utility of an ad (which assumes that all advertisers are bidding their true utility) is the expected cost per impression (eCPI) for the ad. The eCPI of a configuration may be the sum of the eCPI of the participants constituting the configuration. The eCPI of a participant ad should account for a change in utility due to being placed in some position, served with some color, served with some frequency, etc. (though is not necessary). That is, the eCPI of a participant ad should reflect the treatment of the participant ad.

The utility of an ad configuration need not reflect only the impact of the ad on revenues and/or the user's immediate satisfaction. An ad configuration may also influence future behavior. For example, if very relevant ads are placed in prominent positions such as the top of the page, users may learn to click more frequently on those ads. If certain font treatments or colors are used to signal relevance, then these treatments may lead to higher selection rates in the future. As a third example, ads that have low relevance may be disabled and not shown an all, so as not to discourage users from clicking ads in the future. Hence, the utility of a particular configuration could reflect the impact on future behavior. Various schemes, such as the use of a Vickrey-Clark-Groves (VCG) auction or a Simultaneous Ascending auction for example, may be used to induce advertisers to report (e.g., offer or bid) their true value. There is existing evidence that the VCG auction is an effective way to induce truth telling in combinatorial auctions. See, for example, Morgan, John "Combinatorial Auctions in the Information Age: an Empirical Study", *Advances in Applied Microeconomics* Vol. 11, M. Baye, ed., JAI Press, 2002 available at http://faculty.haas.berkeley.edu/rjmorgan/Combinatorial.pdf.

In at least one embodiment consistent with the present invention, the best configuration for a given set of participants may be expressed as:

$$c_{best}(P) = \arg\max\ c[U(c)|c \text{ in } C(\ )].$$

That is, best configuration may be defined as the configuration with the maximum utility, given the configurations in the set of configurations. This is the configuration that, given the participants, reflects the maximum "reported" utility, where the advertiser's maximum offer per impression, selection (perhaps multiplied by a selection rate) or conversion (perhaps multiplied by a conversion rate) is the reported utility, which is assumed to equal the advertiser's actual utility.)

§ 4.3.1.1 Utilities Need Not be Normalized for Position or Other Ad Treatments

The utility, or a factor from which a utility value is derived (e.g., eCPI), need not be normalized for position or other ad treatments. For example, if three ads—A, B and C—are participating, the utilities of the following configurations: {A,B,C}, {A,C,B}, {B,A,C}, {B,C,A}, {C,A,B}, {C,B,A} (all ads participating), {A,B}, {B,A}, {B,C} (only two of the three ads participating), {A}, {B}, {C} (only one of the three ads participating), and U{ } (no ads participating, and therefore, no ads served), could be compared. There is no requirement for a configuration to correspond to vertically arranged ad spots, or to have any ordering. If the configurations available happen to be vertically arranged, then it's likely (although not always the case) that selection rates in the top ad spot positions will be higher than the selection rates in bottom ad spot positions. If the vertically arranged ad spot positions have a monotonically decreasing selection rate, then it will happen to be that the winning configuration will be one where the $score_{top\ ad} \geq score_{middle\ ad} \geq score_{bottom\ ad}$, where the score corresponds to a utility component (e.g., eCPI) contributed by the ad.

§ 4.3.1.2 Inherent Elimination of Utility-Robbing "Bottom Feeders"

In some ad serving systems, some advertisers set their maximum offer to a minimum threshold value or auction reserve price (e.g., $0.05). In doing so, such advertisers may have their ad served in a less desirable ad slot (e.g., on the at the bottom of a Web page), but served nonetheless. In an ad serving system which charges an advertiser only when its ad is selected, such advertisers (referred to as "bottom feeders") can obtain some very inexpensive selections. This is not necessarily a bad thing, unless, of course, the serving of the ad of the bottom feeder decreases the utility of other ads, collectively, by an amount greater than its utility. By considering the utility of configurations that don't serve ads in every ad spot, such utility-robbing bottom feeders can be eliminated.

§ 4.3.2 Exemplary Techniques for Determining Advertiser Payments

In at least some embodiments consistent with the present invention, each participant (x) in the set of participants (P) of the best configuration pays:

participant's maximum offer−($U$(Best($P$))−$U$(Best($P\backslash\{x\}$))).

That is, a maximum offer (e.g., per impression, selection, conversion, etc.) is discounted by an amount that compares the utility of the best configuration (which includes the participant x), with the utility of the best configuration without the participant x. Note that the Best($P\backslash\{x\}$) is not the same as Best($P$) $\backslash\{x\}$. It may very well be that a completely different configuration would be chosen if x is not a participant. Under the foregoing cost determination function, each participant gets a discount equal to the amount of utility value that they contribute (when compared with the "best" utility of a configuration not including the participant). The amount the participant P pays may be subject to further adjustments.

In at least some alternative embodiments consistent with the present invention, each participant may pay an amount based on the loss of utility that they cause to other participants (such as displaced or dropped participants). In such embodiments, each participant (x) in P may pay:

$U$(Best($P\backslash\{x\}$))−($U$(Best($P$))−participant's maximum offer).

In the foregoing exemplary embodiments, it was assumed that the utility was expressed in the same units as the participant's maximum offer (e.g., dollars). If the utility is expressed in some other terms, it may be converted (e.g., using a conversion factor) to a unit corresponding to that of the participant's maximum offer.

§ 4.3.3 Exemplary Apparatus

Figure 6:
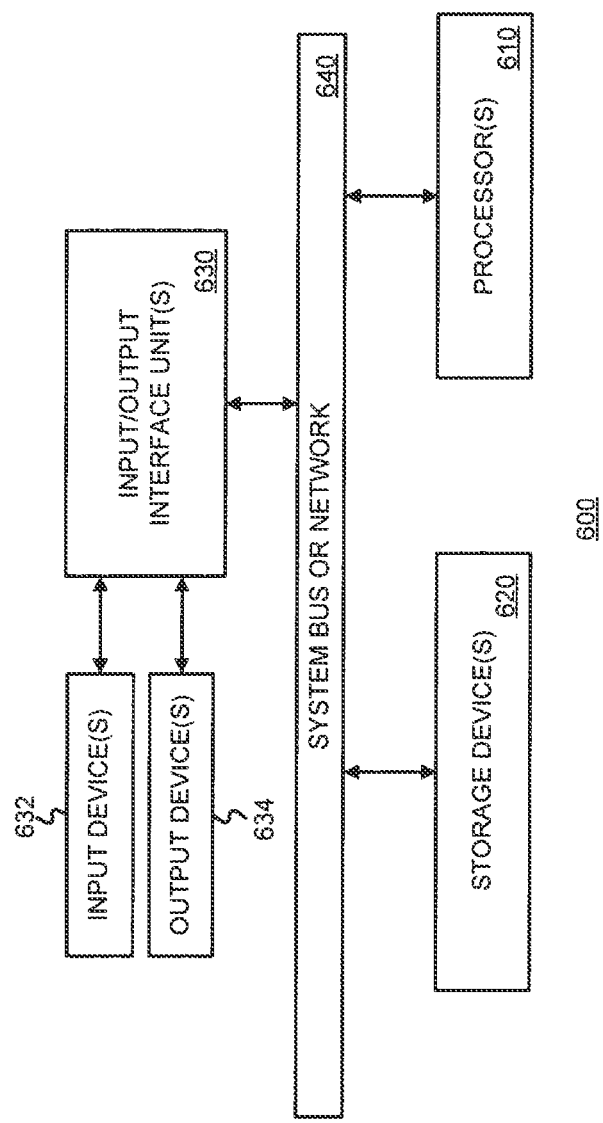
FIG. 6 is a block diagram of an exemplary apparatus that may perform various operations and store various information in a manner consistent with the present invention.

FIG. 6 is high-level block diagram of a machine 600 that may perform one or more of the operations and/or store the information described above. The machine 600 basically includes one or more processors 610, one or more input/output interface units 630, one or more storage devices 620, and one or more system buses and/or networks 640 for facilitating the communication of information among the coupled elements. One or more input devices 632 and one or more output devices 634 may be coupled with the one or more input/output interfaces 630.

The one or more processors 610 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 620 and/or may be received from an external source via one or more input interface units 630.

In one embodiment, the machine 600 may be one or more conventional personal computers. In this case, the processing units 610 may be one or more microprocessors. The bus 640 may include a system bus. The storage devices 620 may include system memory, such as read only memory (ROM) and/or random access memory (RAM). The storage devices 620 may also include a hard disk drive for reading from and writing to a hard disk, a magnetic disk drive for reading from or writing to a (e.g., removable) magnetic disk, and an optical disk drive for reading from or writing to a removable (magneto-)optical disk such as a compact disk or other (magneto-)optical media.

A user may enter commands and information into the personal computer through input devices 632, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 610 through an appropriate interface 630 coupled to the system bus 640. The output devices 634 may include a monitor or other type of display device, which may also be connected to the system bus 640 via an appropriate interface. In addition to (or instead of) the monitor, the personal computer may include other (peripheral) output devices (not shown), such as speakers and printers for example.

The various operations described above may be performed by one or more machines 600, and the various information described above may be stored on one or more machines 600. The ad server 310, search engine 320, content server 330, e-mail server 340, and/or user device 350 may include one or more machines 600.

§ 4.3.4 Alternatives and Extensions

In some of the examples above, the utility of a configuration was defined as the sum of eCPIs of the served ads. Naturally, in some other embodiments consistent with the present invention, the utility may be defined in other ways. For example, it is possible that the utility for a given configuration is not the sum of the utility of the individual components of the configuration. For example, ad diversity may affect utility. More specifically, for example, a selection rate of an ad may depend on the presence (and content, and treatments) of other ads on a document. Determining the utility of a configuration may account for this in at least some embodiments consistent with the present invention.

A utility may generally reflect a value (of serving the ad) to one or more of (a) the ad delivery system (e.g., eCPI), (b) the publisher or owner of the document on which, or with which, the ad will be served, (c) the end user to which the ad will be rendered, (d) other advertisers (on the same document, or in general), and (e) a regulator.

For example, in some exemplary embodiments consistent with the present invention, an end user's utility for each configuration is considered. (It is easier to determine the advertiser's utility (because they provide an offer indicative of their utility) but it is challenging to determine, or estimate accurately, the user's utility.) In a simple case, the user's utility may be set to 0 when there are ads and set to a positive value when there are no ads. Therefore, that positive value may be assigned to the empty configuration (P={ }). Setting the user's utility in this way effectively serves as a minimum bar or threshold that must be met by a configuration that includes participants. One advantage of this embodiment over defining a flat minimum eCPI for an ad to be served is that if another ad is already served, then the end user's utility might not decrease much if they are presented with a second ad, so the minimum is lower. (That is, A user utility from no ads to one ad might be greater, or much greater, than A user utility from one ads to two ads.) However if no ad is served, then there is a higher barrier to serving an ad. Such an exemplary embodiment would eliminate many of single-ad, low-eCPI Web pages, while not raising the minimum too high when there are other advertisers advertising on the same product.

As another example, the utility value of having an ad that temporarily obscures document content might be positive for the advertiser (since the ad is more likely to at least be noticed), but might be might be negative for the end user (and therefore, possibly the document publisher). Similarly, the utility of having an ad that has richer content (e.g., audio, video, graphics, etc.) might be positive for the advertiser (and perhaps the ad serving system), but negative for an end user (and therefore, possibly, the document publisher).

As another example, it may be that too many ads displayed are overwhelming to end users (e.g., due to clutter or information overload). In at least some embodiments consistent with the present invention, when computing an end user's utility, things on the document on which the ad or ads are to be rendered (e.g., search results, onebox, quicklinks, ads, Froogle, etc.) may be considered.

Experimental data may be used to assign a utility (or negative utility) in such cases.

In some embodiments consistent with the present invention, "bids" of users could be considered in the combinatorial auction (to allow users to express how they value various configurations, or type of configurations), just as advertisers' bids are considered. Similarly, "bids" of publishers could be considered in the combinatorial auction (to allow publishers to express how they value various configurations, or types of configurations).

Although many of the exemplary embodiments described in this specification consider the position of ads, positions are not an inherent and necessary part of the present invention. That is, in some embodiments consistent with the present invention, treatments might not include a position, or an ordered position. In an embodiment that does not include an ordered position (as in other embodiments), configurations describing the treatment of each ad are generated and evaluated. For example, if the treatments are Top, Side, and Bottom, and the participants are ads A, B, and C, then configurations {A:Top}, {B:Top, C:Side}, {C:Top, A:Bottom, B:Side}, etc., can be generated. There is no requirement that there be any ordering among the treatments. However, if the configurations available happen to include vertically arranged document (e.g., Webpage) positions, then it's likely (although not always the case) that the utilities in the top positions are higher than the utilities of the same ad in bottom positions. If the selection rate monotonically decreases with page position (and the selection rate is the basis for utility), it will happen to be that the winning scheme will have utility at position 1≥utility at position 2≥utility at position 3.

As just stated, although positions are not an inherent part of the present invention, it's very likely that positions will be part of any treatment in current online advertising systems in which ads are vertically arranged on a page linearly. However, with configuration auctions consistent with the present invention, it is possible for positions to be somewhat arbitrary. For example, the treatments could be something more flexible, such as (x_pos, y_pos, width, height) (in pixels). In such an embodiment, many configurations could be generated and those with overlap could be filtered out. A simpler (and much more practical) embodiment consistent with the present invention would be to create a grid and then assign ads to positions on the grid. Advertisers could be permitted to bid on multiple (contiguous) ad spots. Suppose, for example, that advertiser A is willing to pay $10 CPM for one grid spot and $15 CPM for two grid spots, while advertiser B is willing to pay $7 CPM for a grid spot. In this example (assuming utility of a configuration was the sum of the CPM), the ads of both advertisers A and B would be shown, each in one grid spot. However, if advertiser B was bidding only $2 CPM, then a double-wide ad spot for advertiser A would be shown. As can be appreciated from the foregoing example, the present invention is useful for instances where different types of ads take up different numbers of ad spots (e.g., an image ad may occupy the same amount of space of 3 or 4 text ads).

In at least some embodiments consistent with the present invention, one or more policy constraints can be imposed on the configurations. One policy might be to allow only one ad from any advertiser. Another policy might be to that all ads to be rendered on a document have to be of the same type (e.g., either all image ads, or all text ads, but not a mixture of both). Yet another policy might be to allow only one ad for any visible URL. Still another policy might be to allow only ads that meet a particular performance threshold to be shown in a particular ad spot, such as a prominent position at the top of a page. Configuration arbitrations (e.g., auctions) consistent with the present invention allow such policies to be enforced, but also allow much more complex policies to be implemented. Any generated configuration that does not meet the policy requirements can be filtered out (or not generated in the first place).

At least some embodiments consistent with the present invention may allow complex offers (e.g., bids). For example, one complexity with CPM (cost per thousand impressions) ads is that position will often matter a great deal to the advertisers. The top spot is worth more than the bottom spot, and the relative value is often not just the difference in selection rates. Thus, for example, an advertiser might value the top of the page at $10 CPM, the bottom of the page at $0.50 CPM, and exclusivity (when only its ad is shown) at $30 CPM. As another example, an advertiser might not want to appear next to a competitor. As yet another example, an advertiser may be willing to pay more to appear directly above a competitor. Configuration arbitrations (e.g., auctions) consistent with the present invention permit the expression of such complex offers because utility may be computed after the configuration is known (so offers can depend on position, other participants, etc.).

For each possible configuration, the utility can include (or be defined as) $SUM_i(Pr[\text{see ad } i]*Pr[\text{select ad } i|\text{see ad } i]*E[U(i)])$—namely, the probability of seeing an ad (which may depend on the item page position, the style of the ad, the size of the ad, etc.), multiplied by the probability of the user selecting an ad (which may depend on how good the creative or snippet looks), multiplied by the expected utility to the user of that item (which may depend on the landing page). In at least some embodiments consistent with the present invention, the time it takes before the user finds something may be a component of a configuration's utility. Thus, for example, excessive time spent by a user might have a negative utility. As can be appreciated from the foregoing, embodiments consistent with the present invention may be used to decide how many ads to show, how many search results to show, how to order them, whether to promote ads to the top, whether to show froogle or onebox, etc.

Generating configurations can lead to a huge explosion of configurations, most of which may be pruned out later. Embodiments consistent with the present invention can use optimizations, which depend on the type of treatments allowed, to improve performance. For example, if the treatments are simply slot_position (for example, "T2" is the 2nd top position), one of more of the following optimizations may be used. A "contiguous ads" optimization may require that if an ad is assigned to position k>1, then there is also an ad in position k−1. A "non-overlap" optimization may require that if an ad is assigned to position k, then no other ad is also assigned to position k. This "exclusivity" rule might not apply to all forms of treatments, but does apply to positions. For example, making font size and color are exclusive may be used to reduce the number of configurations. An "ordering" optimization may require that if ad A has a higher utility than ad B, then ad A will always be assigned to a better position (e.g., a position higher up) than ad B. Rules such as the foregoing can be used to greatly decrease the number of configurations that need to be examined.

§ 4.4 Examples of Operations

Figure 7A:
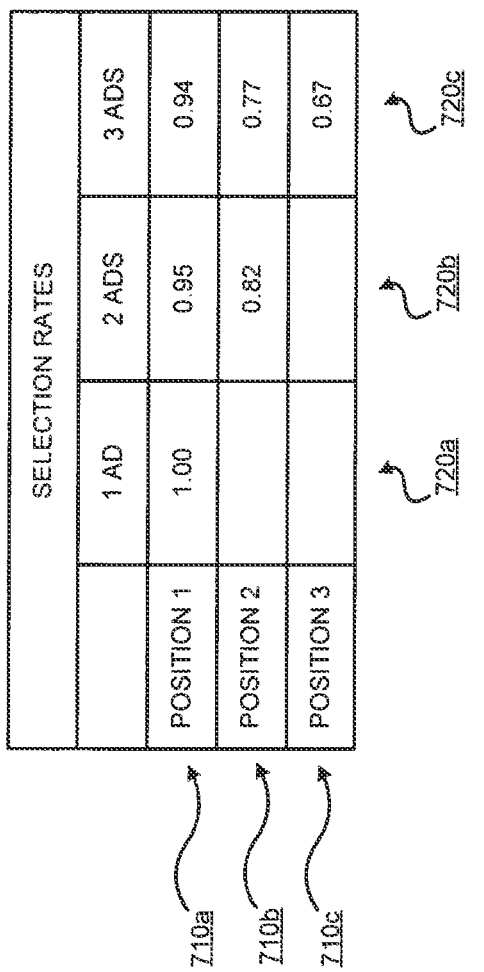

An example of operations in an exemplary embodiment consistent with the present invention is now described with reference to FIGS. 7A and 7B. In the following example, it is assumed that different ad parameters (e.g., colors, fonts, etc.) are not considered, but that vertical position in the right margin of the Web page is the only ad treatment considered. In the following example, it is assumed that the ads have the same (e.g., normalized) selection rate. FIG. 7A shows selection rates (e.g., clickthrough rates) for various ad spot positions and various numbers of ads served. In particular, notice that the selection rate of position 1 is highest if only a single ad is shown (1.00%), lower if two (2) ads are shown (0.95%), and slightly lower again if three (3) ads are shown (0.94%). Notice also, that the selection rate of position 2 drops when three (3) ads are shown (0.77%) as compared to when two (2) ads are shown (0.82%).

FIG. 7B shows the calculated utility for each of a number of configurations. The configuration with the highest total utility is c7, so the configuration including ads {A, B} is served. The "bottom feeder" is (narrowly) excluded because it decreases the value of the first two positions (by a mere $2.15).

Payments may be determined as follows. Suppose ad A was not in the auction. The highest valued configuration without ad A (i.e., c51, which is {B}) would have been chosen. A pays the utility it received in c7 ($95.00) minus the change in utility ($168.80−$90.00)=$16.20. Suppose ad B was not in the auction. The highest valued configuration without ad B (i.e., c15, which is {A}) would have been chosen. B pays its utility ($73.80) minus the change in utility ($168.80−$100.00)=$5.00.

It is believed that utility robbing bottom feeders will occur more often in content targeted ads (such as those used in AdSense from Google for example), than search ads (such as those used in AdWords from Google for example). Consider, for example the following utility adjustment table of FIG. 7C for a horizontal block of four (4) content ads.

FIGS. 8-10 provide an example that illustrates how different configurations can be determined for different ad spots and different ad creative source information. As shown in FIG. 8, document (e.g., Web page) 800 includes content 810, two (2) color wide-format ad spots 812, 814, and one (1) normal ad spot 820. FIG. 9 illustrates how source information (e.g., creative text) from three (3) different ads 910 can be used to generate nine (9) different ad participants (the "not rendered" participant is not shown) 920. For example, for each ad creative text, the ad may be rendered as a "wide with color ad," or as a normal ad. Further, the wide with color ad may be rendered in the top 812 of the two (2) wide with color ad spots, or in the bottom 814 of the two (2) wide with color ad spots. Thus, ad information (e.g., creative text) for a first number of ads can be used to generate a larger number of participants. The ads may have been determined to be relevant to the document 800, a request (e.g., a search query) used to generate the document 800, and/or the content 810 of the document 800.

FIG. 10 is a table 1000 which includes a number of entries 1010, where each entry corresponds to a configuration of ads that may be rendered on document 800. As shown, for each configuration, one of the three ads (or no ad) is provided in (i) the wide with color top ad spot 812 (See column 1020.), (ii) the wide with color bottom ad spot 814 (See column 1030.), and (iii) the normal ad spot 820 (See column 1040.). In this example, no ad can appear in more than one ad spot, but there may be more than one ad spot with no ad. Other policies are possible, and may be more or less restrictive. As can be appreciated from FIG. 10, there are 34 possible (6 permutations with no blank ad spots+18 permutations with one blank ad spot+9 permutations with two blank ad spots+ one configuration with three blank ad spots) configurations 1010 in this particular example.

§ 4.5 Conclusions

As can be appreciated from the foregoing, at least some embodiments consistent with the present invention for making ad serving determinations may (i) better maximize value to an ad delivery system (e.g., in terms of eCPI), advertisers, document publishers, and/or end users, (ii) account for annoyance and/or benefit to an end user in being presented with ads (or more ads), (iii) handle situations without a clear notion of ad spot positions, and/or (iv) eliminate the need for minimum reserve prices. At least some embodiments consistent with the present invention advantageously permit the number of ads to be rendered on a document to be determined dynamically (e.g., based on what maximizes utility (value)). At least some embodiments consistent with the present invention can handle situations without a clear notion of "ordered positions" (such as Webpages with the top and right ads, or content ads where there can be three ads side by side, etc.), and in fact can handle any number of ads placed anywhere on the document with any size. At least some embodiments consistent with the present invention can avoid the need for minimum "reserve prices" (although there may be reasons to still employ such minimum reserve prices). At least some embodiments consistent with the present invention can handle ads of non-uniform size and placement (e.g., image ads mixed with text ads). At least some embodiments consistent with the present invention support complex offers, for example allowing advertisers to bid differently for different positions, allowing advertisers to adjust their bids based on other ads on the document, etc. At least some embodiments consistent with the present invention account for other items on a document (e.g., search results, onebox, quicklinks, other ads, etc.) when choosing which ads to display, how they are to be displayed, and where on the document they are to be displayed.

What is claimed is:

1. A method comprising:
   receiving a request for ads to be presented with a graphical interface, the request specifying attributes for each of a plurality of ad spots in the graphical interface;
   identifying a plurality of sets of ad creation information relevant to the request for ads, wherein each set of the plurality of sets of ad creation information includes one or more of a title line, ad text, a link, an image file, an audio file, a video file, embedded information, or executable code;
   for each of the plurality of sets of ad creation information and for each of the plurality of ad spots, determining a utility value for presenting, in the ad spot, an ad participant generated based on the set of ad creation information and the attributes for the ad spot;
   determining, by one or more processors, a plurality of configurations of the ad participants for the plurality of ad spots, wherein each of the configurations includes a different set of the ad participants, and wherein at least one of the configurations includes a number of ad participants that is less than a number of the plurality of ad spots, which results in one or more empty ad spots that each have a utility value corresponding to one or more of (i) a value to a user for not being presented with an ad in the ad spot, (ii) a value to a publisher of the document for not serving an ad in the ad spot, or (iii) a value to other ad participants for no ad being served in the ad spot;
   for each of the plurality of configurations, determining a utility value of the configuration by combining the determined utility values for the ad participants included in the configuration, wherein the utility value of the configuration indicates one or more of an expected performance value or an expected user satisfaction value of the configuration, wherein each of the determined utility values for each of the ad participants varies based on (i) which other of the ad participants are included in the configuration and (ii) a number of empty ad spots in the configuration compared to a number of filled ad spots in the configuration;
   selecting a configuration from the plurality of configurations having a highest determined utility value; and
   transmitting the set of ad participants included in the selected configuration for presentation with the graphical interface.

2. The method of claim 1, wherein attributes for an ad spot include at least one of a position of the ad spot, a size of the ad spot, a color to be used in an ad participant presented in the ad spot, or a font to be used in an ad participant presented in the ad spot.

3. The method of claim 1, wherein determining the utility value for presenting the ad participant in the ad spot comprises determining the utility value based on a treatment of the ad participant, wherein the treatment includes at least one of ad size, ad color, ad font, ad brightness, ad style, display position, or display frequency.

4. The method of claim 1, wherein determining the plurality of configurations includes determining a configuration having zero ad participants resulting in only empty ad spots, and the configuration having zero ad participants has a utility value corresponding to a value to a user of not being presented with any ad participants in the ad spots.

5. The method of claim 1, comprising:
   reducing a number of the plurality of configurations by removing configurations that include an ad participant that does not have a specified attribute,
   wherein determining a utility value of the configuration for each of the plurality of configurations comprises determining the utility value of the configuration for each of the reduced plurality of configurations, and
   wherein selecting a configuration from the plurality of configurations comprises selecting a configuration from the reduced plurality of configurations.

6. A system, comprising:
   at least one permanent storage device; and
   one or more processors configured to:
     receive a request for ads to be presented with a graphical interface, the request specifying attributes for a plurality of ad spots in the graphical interface;
     identify a plurality of sets of ad creation information relevant to the request for ads, wherein each set of the plurality of sets of ad creation information includes one or more of a title line, ad text, a link, an image file, an audio file, a video file, embedded information, or executable code;
     for each of the plurality of sets of ad creation information and for each of the plurality of ad spots, determine a utility value for presenting, in the ad spot, an ad participant generated based on the set of ad creation information and the attributes for the ad spot;
     determine a plurality of configurations of the ad participants for the plurality of ad spots, wherein each of the configurations includes a different set of the ad participants, and wherein at least one of the configurations includes a number of ad participants that is less than a number of the plurality of ad spots, which results in one or more empty ad spots that each have a utility value corresponding to one or more of (i) a value to a user for not being presented with an ad in the ad spot, (ii) a value to a publisher of the document for not serving an ad in the ad spot, or (iii) a value to other ad participants for no ad being served in the ad spot;
     for each of the plurality of configurations, determine a utility value of the configuration by combining the determined utility values for the ad participants included in the configuration, wherein the utility value of the configuration indicates one or more of an expected performance value or an expected user satisfaction value of the configuration, wherein each of the determined utility values for each of the ad participants varies based on (i) which other of the ad participants are included in the configuration and (ii) a number of empty ad spots in the configuration compared to a number of filled ad spots in the configuration;
     select a configuration from the plurality of configurations having a highest determined utility value; and transmit the set of ad participants included in the selected configuration for presentation with the graphical interface.

7. The system of claim 6, wherein attributes for an ad spot include at least one of a position of the ad spot, a size of the ad spot, a color to be used in an ad participant presented in the ad spot, or a font to be used in an ad participant presented in the ad spot.

8. The system of claim 6, wherein the one or more processors are configured to determine the utility value for presenting the ad participant in the ad spot based on a treatment of the ad participant, wherein the treatment includes at least one of ad size, ad color, ad font, ad brightness, ad style, display position, or display frequency.

9. The system of claim 6, wherein the plurality of configurations includes a configuration having zero ad participants resulting in only empty ad spots, and the configuration having zero ad participants has a utility value corresponding to a value to a user of not being presented with any ad participants in the ad spots.

10. The system of claim 6, wherein the operations comprise:
reducing a number of the plurality of configurations by removing configurations that include an ad participant that does not have a specified attribute,
wherein determining a utility value of the configuration for each of the plurality of configurations comprises determining the utility value of the configuration for each of the reduced plurality of configurations, and
wherein selecting a configuration from the plurality of configurations comprises selecting a configuration from the reduced plurality of configurations.

11. A non-transitory computer storage medium encoded with instructions that when executed by one or more processors cause the one or more processors to perform operations comprising:
receiving a request for ads to be presented with a graphical interface, the request specifying attributes for each of a plurality of ad spots in the graphical interface;
identifying a plurality of sets of ad creation information relevant to the request for ads, wherein each set of the plurality of sets of ad creation information includes one or more of a title line, ad text, a link, an image file, an audio file, a video file, embedded information, or executable code;
for each of the plurality of sets of ad creation information and for each of the plurality of ad spots, determining a utility value for presenting, in the ad spot, an ad participant generated based on the set of ad creation information and the attributes for the ad spot;
determining, by one or more processors, a plurality of configurations of the ad participants for the plurality of ad spots, wherein each of the configurations includes a different set of the ad participants, and wherein at least one of the configurations includes a number of ad participants that is less than a number of the plurality of ad spots, which results in one or more empty ad spots that each have a utility value corresponding to one or more of (i) a value to a user for not being presented with an ad in the ad spot, (ii) a value to a publisher of the document for not serving an ad in the ad spot, or (iii) a value to other ad participants for no ad being served in the ad spot;
for each of the plurality of configurations, determining a utility value of the configuration by combining the determined utility values for the ad participants included in the configuration, wherein the utility value of the configuration indicates one or more of an expected performance value or an expected user satisfaction value of the configuration, wherein each of the determined utility values for each of the ad participants varies based on (i) which other of the ad participants are included in the configuration and (ii) a number of empty ad spots in the configuration compared to a number of filled ad spots in the configuration;
selecting a configuration from the plurality of configurations having a highest determined utility value; and
transmitting the set of ad participants included in the selected configuration for presentation with the graphical interface.

12. The non-transitory computer storage medium of claim 11, wherein attributes for an ad spot include at least one of a position of the ad spot, a size of the ad spot, a color to be used in an ad participant presented in the ad spot, or a font to be used in an ad participant presented in the ad spot.

13. The non-transitory computer storage medium of claim 11, wherein determining the utility value for presenting the ad participant in the ad spot comprises determining the utility value based on a treatment of the ad participant, wherein the treatment includes at least one of ad size, ad color, ad font, ad brightness, ad style, display position, or display frequency.

14. The non-transitory computer storage medium of claim 11, wherein determining the plurality of configurations includes determining a configuration having zero ad participants resulting in only empty ad spots, and the configuration having zero ad participants has a utility value corresponding to a value to a user of not being presented with any ad participants in the ad spots.

15. The medium of claim 11, wherein the operations comprise:
reducing a number of the plurality of configurations by removing configurations that include an ad participant that does not have a specified attribute,
wherein determining a utility value of the configuration for each of the plurality of configurations comprises determining the utility value of the configuration for each of the reduced plurality of configurations, and
wherein selecting a configuration from the plurality of configurations comprises selecting a configuration from the reduced plurality of configurations.

* * * * *